(12) United States Patent
Appleby et al.

(10) Patent No.: US 9,723,046 B2
(45) Date of Patent: Aug. 1, 2017

(54) CONTENT DELIVERY

(75) Inventors: Stephen Clifford Appleby, London (GB); Ian Barry Crabtree, London (GB); Michael Erling Nilsson, London (GB); Rory Stewart Turnbull, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 410 days.

(21) Appl. No.: 13/876,543

(22) PCT Filed: Sep. 30, 2011

(86) PCT No.: PCT/GB2011/001436
§ 371 (c)(1),
(2), (4) Date: Mar. 28, 2013

(87) PCT Pub. No.: WO2012/042230
PCT Pub. Date: Apr. 5, 2012

(65) Prior Publication Data
US 2013/0185399 A1    Jul. 18, 2013

(30) Foreign Application Priority Data

Sep. 30, 2010   (EP) .................................... 10251706

(51) Int. Cl.
*G06F 15/16*   (2006.01)
*H04L 29/06*   (2006.01)

(52) U.S. Cl.
CPC ........ *H04L 65/607* (2013.01); *H04L 65/4084* (2013.01)

(58) Field of Classification Search
CPC ............. H04L 65/1069; H04L 65/602; H04N 21/23406; H04N 21/2662; H04N 21/4331; H04N 21/44004; H04N 21/44016; H04N 21/4621
See application file for complete search history.

(56) References Cited

U.S. PATENT DOCUMENTS

| | | | |
|---|---|---|---|
| 7,277,958 B2 * | 10/2007 | Chung et al. | 709/231 |
| 7,908,389 B2 * | 3/2011 | Zuckerman et al. | 709/231 |
| 8,135,061 B1 * | 3/2012 | Ganesan | H04N 19/115 375/240.02 |
| 8,335,238 B2 * | 12/2012 | Arimilli et al. | 370/476 |
| 9,002,881 B2 * | 4/2015 | Bocharov et al. | 707/770 |

(Continued)

FOREIGN PATENT DOCUMENTS

WO   WO 2010/054690   5/2010

OTHER PUBLICATIONS

International Search Report for PCT/GB2011/001436 mailed Nov. 25, 2011.

*Primary Examiner* — Cheikh Ndiaye
(74) *Attorney, Agent, or Firm* — Nixon & Vanderhye P.C.

(57) ABSTRACT

A method for providing equitable media streaming between an HTTP server and a number of receivers via shared network. The streaming data is processed to split the data across a number of sub-streams. Each sub-stream contains non-contiguous data. A receiver requesting the streaming media establishes a number of TCP sessions, one for each sub-stream and the received sub-stream data is reassembled at the receiver so that the streaming media can be presented.

14 Claims, 6 Drawing Sheets

(56) References Cited

U.S. PATENT DOCUMENTS

Figure 1:
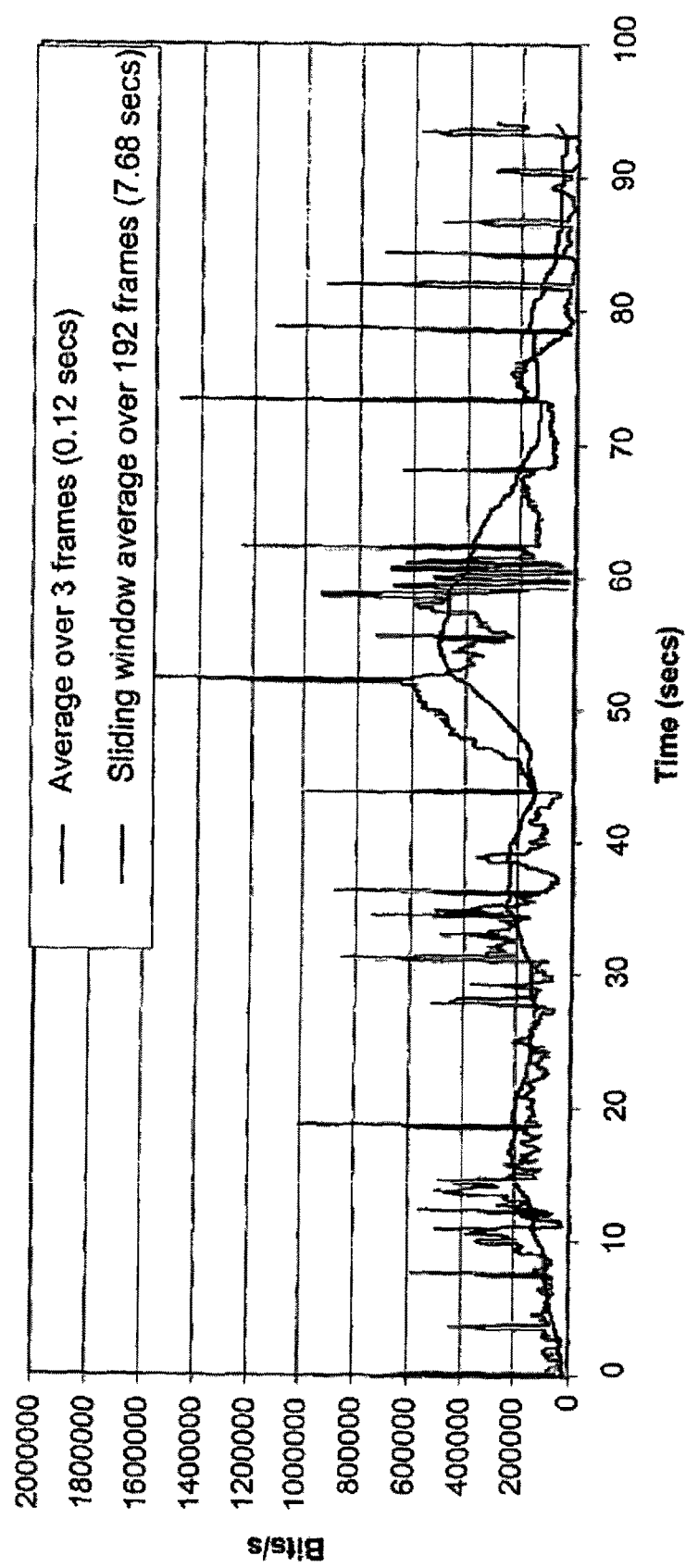

| | | |
|---|---|---|
| 2005/0066063 A1* | 3/2005 | Grigorovitch et al. ........... 710/1 |
| 2006/0233237 A1* | 10/2006 | Lu ........................ H04N 19/176 |
| | | 375/240.03 |
| 2007/0002946 A1* | 1/2007 | Bouton .................. H04N 19/15 |
| | | 375/240.01 |
| 2007/0053303 A1 | 3/2007 | Kryuchkov |
| 2010/0195733 A1* | 8/2010 | Yan ...................... H04N 19/139 |
| | | 375/240.16 |
| 2011/0222669 A1* | 9/2011 | Buriano et al. ............ 379/32.01 |
| 2013/0086264 A1* | 4/2013 | Kini et al. .................... 709/225 |

* cited by examiner

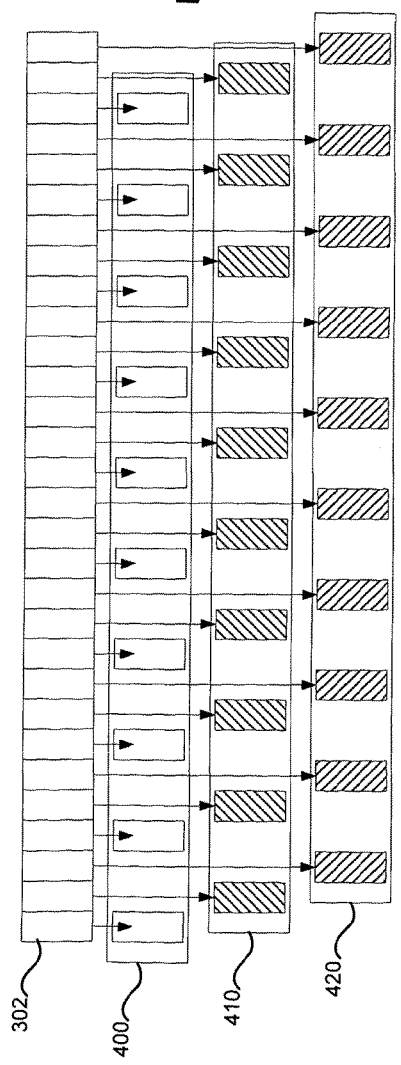
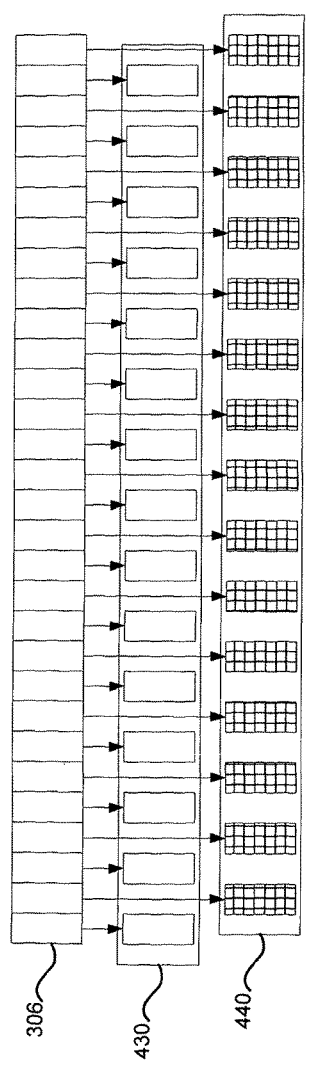
Fig. 4
Fig. 5

CONTENT DELIVERY

This application is the U.S. national phase of International Application No. PCT/GB2011/001436 filed 30 Sep. 2011 which designated the U.S. and claims priority to EP 10251706.7 filed 30 Sep. 2010, the entire contents of each of which are hereby incorporated by reference.

BACKGROUND

The present invention relates to the transmission of video signals over telecommunications networks, and more particularly to a method of controlling the transmission of multiple steams over a congested network so that each stream receives an equitable share of the bandwidth dependent on the quality of the encoding.

Transmission of video data networks, such as the Internet, is commonplace today. To receive such signals, a user can use a suitably configured computer or other receiver such as a "set top box" (STB). STBs have become increasingly popular and many are provided with an IP connection allowing content such as video to be streamed or downloaded over the Internet. Television delivered over the Internet, commonly referred to as IPTV, is a good example of this growing service.

When streaming video data over an IP network, there are no guarantees that the data sent will reach its destination. When the network experiences congestion and other problems, delays will occur to the transmission of the data packets and some packets may even be lost.

To provide more reliable end-to-end delivery of data, the transmission control protocol (TCP) is often used as the transport protocol. Indeed, it is quite common to use TCP in video streaming systems for a number of reasons, but primarily because TCP provides mechanisms for ensuring reliable delivery, and managing network congestion. For example, one way in which TCP achieves reliability is by obliging the receiver to acknowledge to the sender any data received. If a packet of data remains unacknowledged after a predetermined period of time, TCP assumes the packet was not received and the same packet is retransmitted by the sender. One way that TCP manages congestion is by reducing the transmission rate of data as a function of congestion in the network.

For example, where a number of video streams are being delivered using TCP and all share a contended piece of network, when congestion occurs, the TCP congestion control algorithm will force all of the streams to reduce their transmission rate to allow congestion to clear. Each stream is reduced by a fixed factor and eventually all streams will stabilize at approximately the same bandwidth (assuming a similar round trip time). Use of such a method is not without problems as delays to segments of the video streams are particularly undesirable. This can be mitigated at least in part using various techniques such as using receiver buffers and dropping occasional segments and relying on error recovery techniques instead.

Video streams are also sometimes delivered at a variable bitrate over TCP. However, the above congestion scenario may still occur, and two streams each having a different bit rate will still stabilise to roughly the same reduced bitrate when the network is congested. This may result in some particularly undesirable results when a first stream is initially encoded at a high bitrate, for example a video sequence with high frame activity such as a sports sequence, and a second sequence is encoded at a low bitrate, for example a video sequence with a low frame activity such as a news or drama sequence.

When congestion is experienced on the network, TCP will cut the available bandwidth for both streams to roughly the same level. This will affect the first stream, which was encoded at a higher bitrate and this has a higher bandwidth requirement, more than the second stream which might have been encoded at a low bitrate stream. In other words, the first, high bitrate, stream will be more significantly affected than the second, low bitrate, stream as the first stream is given the same reduced bandwidth as the second stream. This will cause the quality of the video delivered to each user to vary over time, and the quality to vary from user to user depending on the type of video clip they are viewing.

Another way of streaming video that mitigates some of these problems experienced under TCP is to use a constant bitrate delivery system where the bitrate available to a video stream is fixed, for example by a reservation scheme, before the transmission of data starts. This method of delivery is easier to manage, but is not without its problems.

Again, taking the example of the two video streams above, where we have a first stream that has very active frames such as a sports clip, and a second stream with less active frames such as a news clip. The bitrate reserved and used to deliver the two streams are fixed at a predetermined rate (that is considered to be sufficient for most applications and in this case for both streams). However, the second stream will not actually require that much bandwidth as the bitrate of the encoding can be much lower that that of the first sequence given that the activity in the second sequence is much less. The second stream transmitted using this fixed bandwidth is thus wasting much of its allocated bandwidth. If the second stream increases the encoding rate so as to utilise the entire bandwidth reserved, the quality of the resulting video is likely to be much higher than the first stream. However, this increase in quality may not necessarily be significant as perceived from the viewer and may thus be wasted. Moreover, this redundant bandwidth is not an efficient use of network resources.

The problems above are heightened when video sequences vary in activity during the sequence. For example, a relatively static news reading sequence might be interspersed with highlights of a football clip which shows a lot of activity.

One known method for streaming video content involves using a dedicated streaming server. These servers are configured to provide streamed content such as video to receivers and furthermore have the capability to monitor the network link to the receivers and adjust the quality of the stream being delivered. However such servers are not supported by all content delivery networks and require a dedicated equipment and setup by the content provider.

HTTP streaming has been developed to emulate the effects of a dedicated streaming server. This is advantageous as HTTP traffic is generally not blocked by firewalls and the content delivery network is adapted to handling HTTP traffic. However, HTTP streaming is limited in that it does not support streaming data as it is being encoded. Also, the HTTP server is not aware of the receiving client's network conditions. It simply serves data in response to a client request. Therefore in order to carry out adaptive streaming using HTTP streaming, a complete video sequence must be encoded at several qualities (or bitrates) and then segmented into chunks, each representing a fixed duration of video. Typically these chunks will be several seconds long. To stream a particular video sequence, the client will send a request to the server containing the identity of a particular chunk of video in dependence on the current available bandwidth on the network. The HTTP server merely fetches the requested video chunk over the network link.

SUMMARY OF THE INVENTION

It is an aim of the present invention to address one or more of the above stated problems.

According to a first aspect of the present invention, there is provided a method of presenting data as set out in claim 1.

A further aspect of the present invention provides a data presentation apparatus as set out in claim 8.

Another aspect of the present invention provides a method of generating a streaming media presentation as set out in claim 9.

A further aspect of the present invention provides an apparatus for generating a streaming media presentation as set out in claim 12.

LIST OF FIGURES

Figure 2:
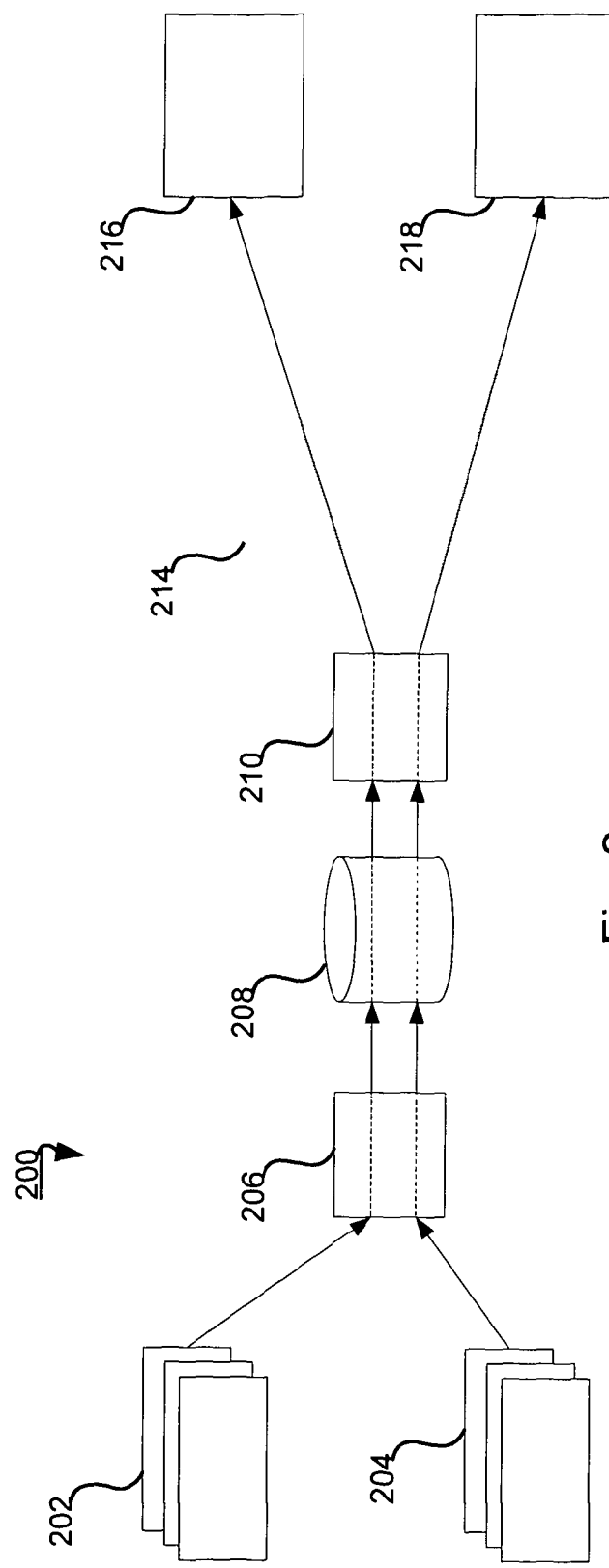
Figure 3:
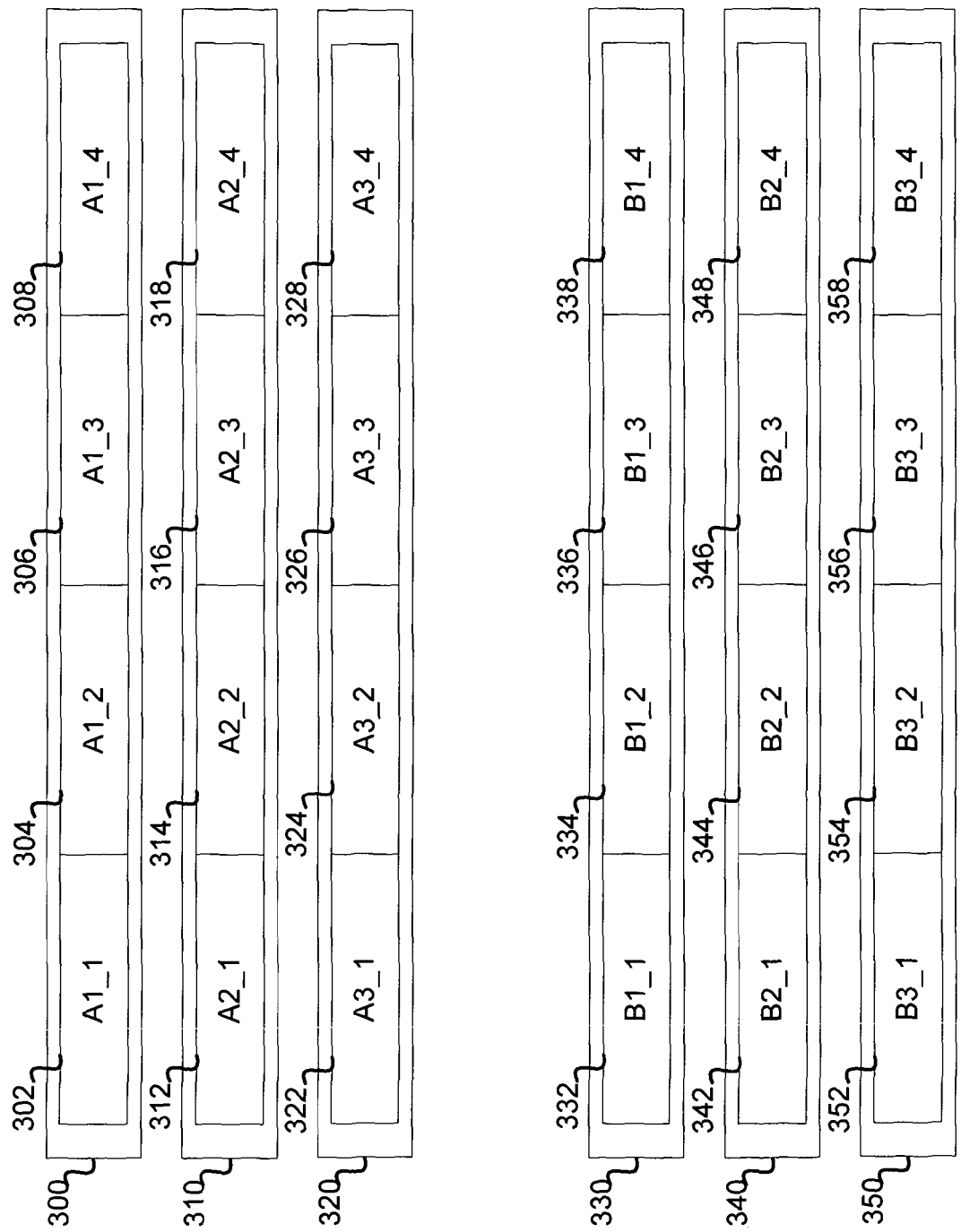
Figure 6:
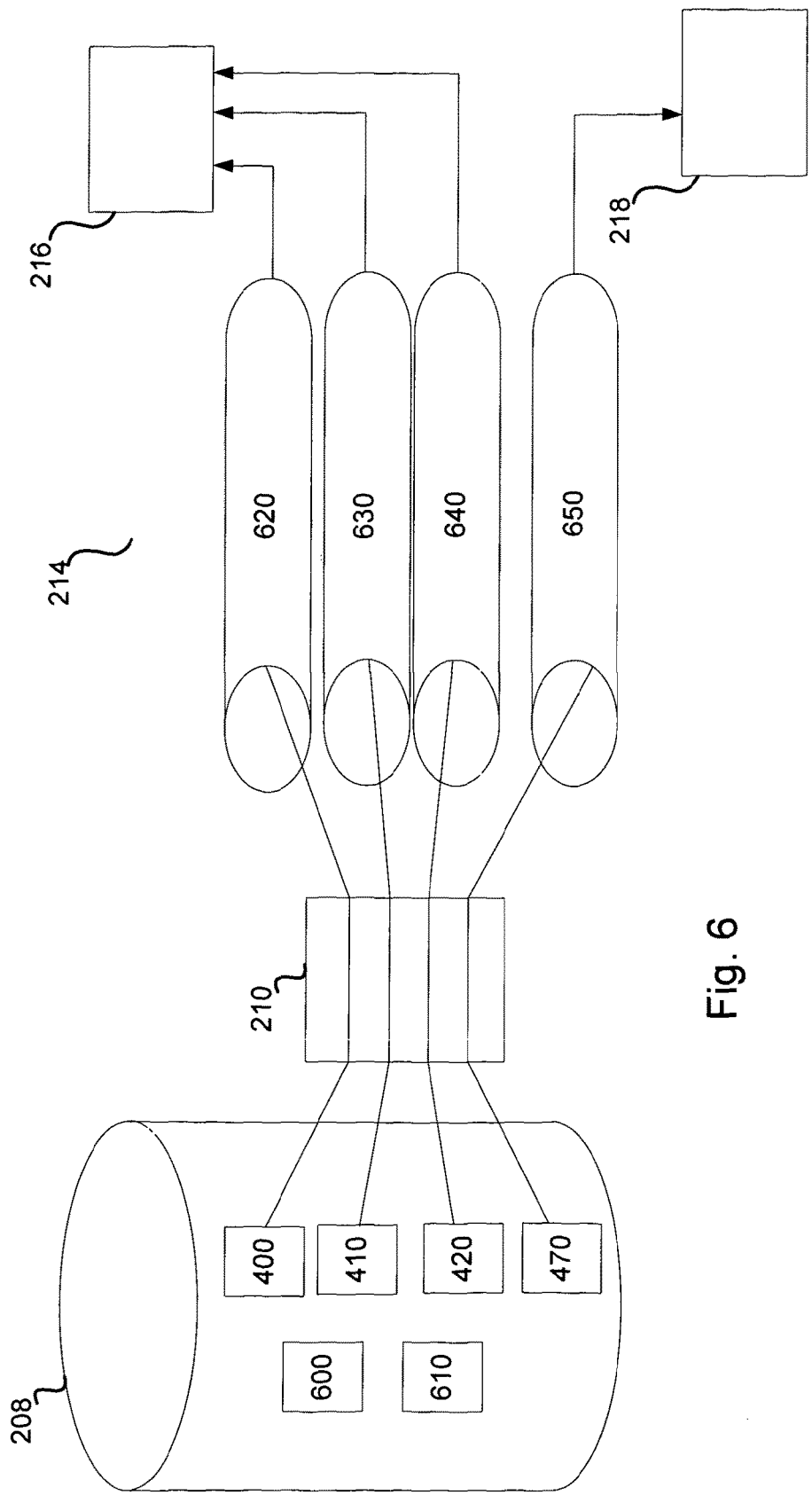
Figure 7:
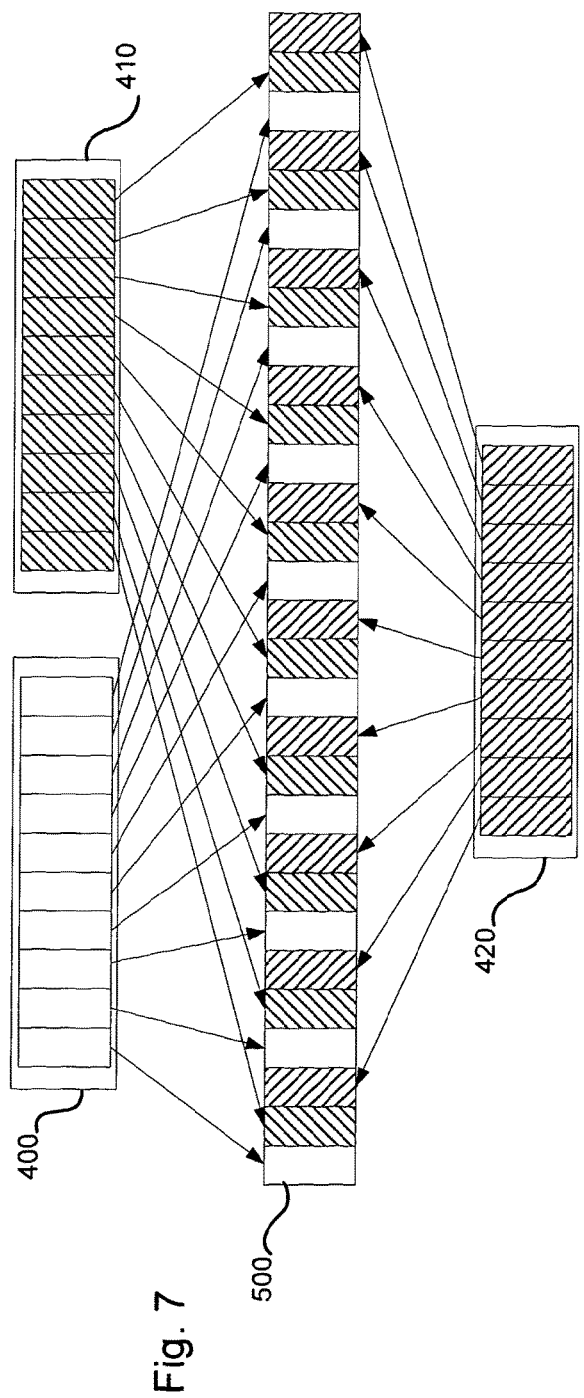
Figure 8:
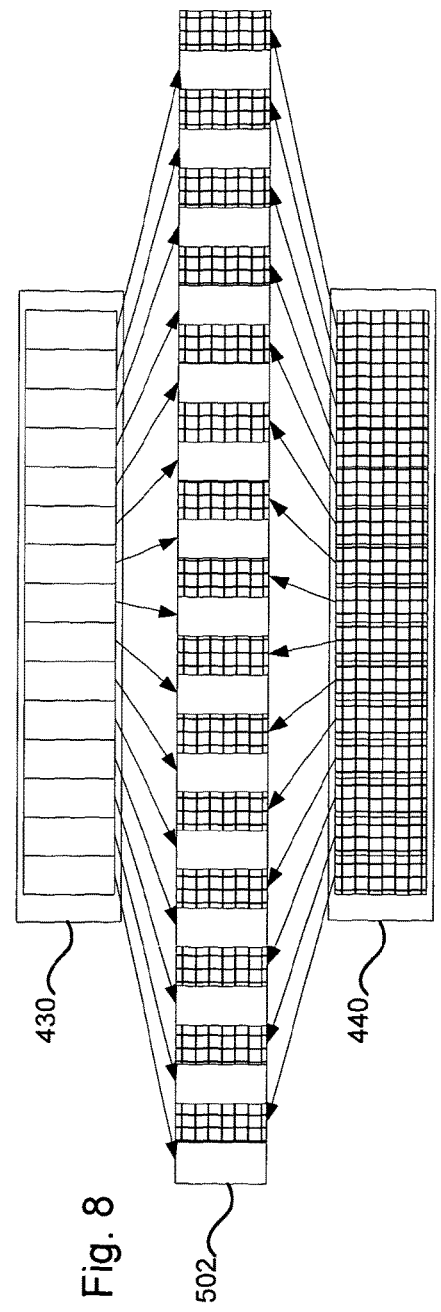

Embodiments according to the first embodiment will now be described with reference to the accompanying Figures in which:

FIG. 1 is a graph showing the variation in bit rates used to encode a video sequence at a constant quality;

FIG. 2 schematically shows the network diagram of a system in an embodiment of the present invention;

FIG. 3 schematically shows two different video clips, each encoded at three different quality levels;

FIG. 4 schematically shows how a particular segment of video is split into three streamlets;

FIG. 5 schematically shows how a different segment of video is split into two streamlets;

FIG. 6 shows the three streamlets illustrated in FIG. 4 are delivered to a receiver at the same time as a different segment of video is delivered to a different receiver over a network;

FIG. 7 schematically shows how the three streamlets of video illustrated in FIG. 4 are reassembled by a receiver; and FIG. 8 schematically shows how the two streamlets of video illustrated in FIG. 5 are reassembled by a receiver.

DESCRIPTION OF THE PREFERRED EMBODIMENTS

The present invention is described herein with reference to particular examples. The invention is not, however, limited to such examples.

It is proposed that video streams transmitted over a contended piece of network are encoded at a constant quality rather than at a constant bitrate. If a video sequence is encoded at constant quality, then the bitrate used is likely to vary dramatically. FIG. 1 shows the bitrate over a 90 second video clip encoded at a constant quality level. In this example, the quality level has been determined by setting a quantiser parameter (qp) to 28. The quantiser parameter effectively controls the quality of the encoding the smaller the value of the quantiser, the better the quality of the encoded video.

The clip used in FIG. 1 is typical of many video sequences, with the bit rate varying in dependence on the complexity of the scene at any given moment in time. For example, a sequence of frames where there is much movement or action usually requires a higher bit rate to encode at the same fixed quality.

Two different traces in FIG. 1 are for showing the effects of two different amounts of buffering. The more dynamic trace is where the bit rate is the average used over three frames, whereas the smoother trace is where a sliding window of 192 frames has been used. Thus, by increasing the amount of buffering, the bit rate is effectively smoothed.

The bitrate for any practical streaming system will vary considerably as a function of the difficulty of encoding the specific sequence of content as described above. This variation is even more apparent when comparing different genres of video clips. For example, sports clips might require a higher average bit rate and fluctuate more due to the high activity of typical scenes, whereas a news report clip might require a much lower bitrate and be relatively static.

As such, to deliver video streams at a constant quality to users sharing a contended network, a constant bandwidth allocation method is not efficient to use across all streams. The bandwidth allocated to each stream must be allowed to dynamically vary in time in accordance with the precise demands of the video being streamed at that time and also be within any network bandwidth constraints.

FIG. 2 shows an example of a system 200 comprising a video encoder 206 connected to a video store 208, which is in turn connected to a HTTP server 210. The HTTP server 210 can communicate with each of two receivers, receiver_A 216 and receiver_B 218, over an IP network 214. The receivers 216 and 218 can make requests to the server 210 for video clips using HTTP streaming.

The encoder 206 encodes video sequences for transmission to the receivers 216 and 218. Here two video sequences are shown, sequence_A 202 and sequence_B 204. The encoder 206 can encode at various bitrates and outputs the encoded video sequences to the data store 208 or directly to the server 210. The data store 208 is used to store encoded video sequences until they are requested or needed by the server 210. The server 210 retrieves the encoded video sequences from the data store 208 or directly from the encoder 206, and transmits them as video streams over the IP network 214 to either of the two receivers 216 and 218. Sequence_A 202 is requested and will be transmitted (after encoding) to receiver_A 216, and sequence_B 204 is requested and will be transmitted to receiver_B 218. The receivers may be suitable configured computers or set top boxed for example, and are adapted to decode the requested video stream and decode the encoded sequences into the original video for viewing by the user.

The encoder 206 is provided with two different video sequences, sequence_A 202 and sequence_B 204. Each video sequence represents a different video clip. In this example, sequence_A 202 is of a sports clip such as a football match, and sequence_B is a news report clip. Both sequence_A 202 and sequence_B 204 are fed into the video encoder 206. The video encoder 206 takes each video sequence and encodes it. The encoding used is MPEG-4 AVC, but could be any other suitably configured video codec.

Each video sequence is split into segments of a predetermined duration, in this example each segment is ten seconds long, and encoded at three different reference qualities. The quality can be varied by adjusting the quantiser parameter to change the encoding quality. However, other tools can be utilised, such as perceptual quality tools that give a measure of the actual perceptual quality of a sequence as perceived by a user.

Of course, fewer or more encoded sequences may be generated corresponding to fewer or more quality levels. In this example, there are three encoded sequences, each encoded at a different quality level, and each comprising four encoded segments. This is shown in more detail in FIG. 3.

FIG. 3 shows video sequence_A 202 encoded into three separate video sequences: encoded video sequence_A1 300, sequence_A2 310 and sequence_A3 320. Encoded video sequence_A1 302 is encoded at a first and highest quality. Encoded video sequence_A2 310 is encoded at a second medium quality. Encoded video sequence_A3 320 is encoded at a third and lowest quality.

Each of the encoded video sequences 300, 310 and 320 are divided into four individual segments, where the start of each segment corresponds to the same point in the un-encoded video sequence_A 202. Thus, the start of segment A1_2 304 corresponds to the start of segment A2_2 314 and also A3_2 324, but where the segments are encoded at different quality levels.

As shown in FIG. 1, the bit rate required to encode a particular video sequence at a fixed quality level will vary over time depending on what is happening in the sequence. As a result, a fixed bitrate is used for the duration of the segment, but can change from one segment to the next in the same sequence. Thus, for sequence_A1 300, the bitrate for segment A1_1 302 may differ from the bitrate for A1_2 304.

Also shown in FIG. 3 are the encoded sequences of video sequences of video sequence_B 204 comprising encoded sequence_B1 330, sequence_B2 340 and sequence_B3 350. The three encoded sequences are each encoded at the same quality levels used for sequence_A 202. Thus, sequence_B1 330 is encoded at the same highest quality level as sequence_A1 300. Sequence_B2 340 is encode at the same medium quality level as sequence_A2 310. Sequence_B3 350 is encode at the same low quality level as sequence_A3 320.

As for the encoded sequences corresponding to sequences_A 202, each of the sequences corresponding to sequence_B 204 are also divided into segments, where each segment is encoded at a constant bitrate dependent on the content of the corresponding portion of the input video sequence at that time, but each segment may vary in bitrate when compared to the next segment in any given sequence.

Thus, the encoder generates encoded video sequences at three reference quality levels for both the video streams (to give six encoded streams).

In this example, a further process is now performed on the encoded streams to split some of the individual segments into further sets of sub-units, hereinafter referred to as streamlets. The number of streamlets generated is dependent on the complexity of the video in each segment, i.e. complex scenes will result in a larger number of streamlets than a less complex scene and very simple scenes may not be split at all.

To generate each streamlet, a bytewise operation is performed on the data structure of each segment. FIG. 4 shows a simple representation of the segment A1_1 being split into three streamlets, set U 400, set V 410 and set W 420, and segment A1_3 split into two streamlets, set X 430 and set Y 440. In this case, segment A1_1 was more complex than segment A1_3 and therefore more streamlets were generated. For ease of explanation only the first thirty blocks (512 bytes) of data forming the segments A1_1 and A1_3 are shown. It will be appreciated that each segment will typically contain more than thirty blocks of data and that segments A1_1 302 and A1_3 306 are not the same size despite both representing ten seconds of video data.

The number of streamlets to be generated for a given segment is proportional to a previously derived parameter "f" relating to the complexity of that segment which is determined as part of the encoding pre-analysis stage. In accordance with the embodiment, rather than simply dividing the total number of blocks (512 bytes) of data forming the segment into a predetermined number of streamlets, each streamlet is formed of non-contiguous data. As shown in FIG. 4, segment A1_1 302 is split into three streamlets:

streamlet U 400 is formed of the $1^{st}$, $4^{th}$, $7^{th}$, $10^{th}$, $13^{th}$, $16^{th}$, $19^{th}$, $22^{nd}$, $25^{th}$ and $28^{th}$ block in segment A1_1;

streamlet V 410 is formed of the $2^{nd}$, $5^{th}$, $8^{th}$, $11^{th}$, $14^{th}$, $17^{th}$, $20^{th}$, $23^{rd}$, $26^{th}$ and $29^{th}$ block in segment A1_1; and streamlet W 420 is formed of the $3^{rd}$, $6^{th}$, $9^{th}$, $12^{th}$, $15^{th}$, $18^{th}$, $21^{st}$, $24^{th}$, $27^{th}$ and $30^{th}$ block in segment A1_1.

FIG. 5 shows how a different Segment A1_3 306, is split into two streamlets:

streamlet X 430 is formed of the $1^{st}$, $3^{rd}$, $5^{th}$, $7^{th}$, $9^{th}$, $11^{th}$, $13^{th}$, $15^{th}$, $17^{th}$, $19^{th}$, $21^{st}$, $23^{rd}$, $25^{th}$, $27^{th}$ and $29^{th}$ block in segment A1_3 306; and streamlet Y 440 is formed of the $2^{nd}$, $4^{th}$, $6^{th}$, $8^{th}$, $10^{th}$, $12^{th}$, $14^{th}$, $16^{th}$, $18^{th}$, $20^{th}$, $22^{nd}$, $24^{th}$, $26^{th}$, $28^{th}$ and $30^{th}$ block in segment A1_3 306.

In this way, the video data for a given segment is striped across different streamlets. Streamlets do not contain contiguous data from the respective segment and therefore the interleaved data in the streamlets are not in themselves playable pieces of media. They must be reconstructed at the receiver end as will be described later.

Once the streamlets have been generated, they are given a unique identifier which in this example is the respective segment's identity with an extra identifier and then the encoded video sequences are saved in the data store 208. The data store 208 stores the encoded video sequences until they are needed by the HTML server.

In addition, the encoder generates a metadata file 600, 610 for each video sequence. In this case, metadata file 600 corresponds to video sequence_A 202 and metadata file 610 corresponds to video sequence_B 204. The metadata files 600, 610 include additional information to correctly stream the sequence including a complexity factor and the qualities of the content available. Furthermore, each metadata file 600, 610 contains information relating to which sequences have been split into streamlets and the identity of the created streamlets. This metadata file will be downloaded by any receivers who request the video sequence and in particular is used to access the streamlets and hence video sequence as will be described later.

Content Delivery

The operation of streaming video data from the HTTP server 210 to a receiver 216, 218 will now be described with reference to FIGS. 6, 7 and 8.

In this example, the server 210 first receives a request from the receiver_A 216 for the video sequence_A 202 in the form of a HTTP GET request, specifying the video sequence_A 202. The HTTP server 210 accesses the data store 208 to retrieve the metadata file 600 associated with the video sequence_A 202 and then responds to the GET request by sending the metadata file 600 to the receiver_A 216.

Upon receipt of the metadata file, the receiver_A 216 determines the state of the network link to the server in order to determine the appropriate quality level of video to request from the server 210. In this example the network condition is sufficiently high enough to support encoded video sequence A1 300. In contrast with a conventional system in which the receiver_A 216 would request segment A1_1, the receiver_A 216 can process the metadata file and is aware that segment A1_1 has been split into streamlets U, V and W 400, 410, 420. The streamlets are identified in the metadata file 600 and therefore the client sends three GET requests to the HTTP server: the first request for streamlet U 400, the second request for streamlet V 410 and the third request for streamlet W 420. This has the effect of creating three TCP sessions between the receiver_A 216 and the HTTP server 210. TCP session 620 for streamlet U 400, TCP session 630 for streamlet V 410 and TCP session 640 for streamlet W 420.

When the server 210 receives the requests, it accesses the data store 208 to retrieve the requested streamlets U, V and W and serves them to the requester_A via the respective created TCP connection 620, 630, 640. In this way, the functionality of the server 210 is not modified, it merely services requests for data stored in the data store 208.

When the receiver_A 216 receives the streamlets U, V and W 400, 410, 420, the data in each streamlet is not contiguous video data and therefore the receiver_A 216 must reassemble the interleaved data from the three streamlets before playback can begin. The process of reassembling the video data from each of the three streamlets U, V and W is shown in FIG. 7. As shown, a reassembled video sequence 500 is created by taking the first block of data in streamlet U 400, followed by the first block of data in streamlet V 410, followed by the first block of data in streamlet W 420. Next reassembly continues by taking the second block of data in streamlet U 400, followed by the second block of data in streamlet V 410, followed by the second block of data in streamlet W 420. The process continues with the respective third blocks, fourth blocks etc in order of streamlet U, V and W.

As this is a streaming system, any reassembled video data in reassembled video sequence 500 can be transferred to a decoder buffer for decoding and playback as is conventional.

The process continues while the streamlets are still being received. Once the streamlets have been completely transferred, the TCP sessions 620, 630, 640 are closed and the metadata file 600 is accessed to determine the identity of the next set of streamlets to be transferred having regard to the current network conditions.

At a later stage, segment A1_3 306 is required by the receiver_A 216. Segment_A1_3 306 has been split into two streamlets, streamlet X 430 and streamlet Y 440. Therefore only two GET requests are sent to the server and only two TCP sessions are maintained while data is transferred. As before the HTTP server 210 serves the streamlet data from the data store 208 and the non-contiguous data is reassembled by the receiver_A 216 before being decoded and presented to the user. FIG. 8 shows the reassembly of segment_A1_3 306 by the receiver_A.

The receiver_A 216 repeats the process of determining the number of streamlets, issuing the appropriate number of GET requests, reassembly and decoding until the video sequence A 202 has been completely streamed to the receiver_A 216.

As also shown in FIG. 6, in this example, receiver_B 218 has requested video sequence_B 204 at the same time as video sequence_A 202 was requested by receiver_A 216. This video sequence is much less complex and therefore it has not been split into streamlets. The network link to the server 210 is moderate and therefore receiver_B 218 selects the medium quality sequence B2 340 and issues only a single HTTP GET request to the server 210 for segment B2_1 342, segment B2_2 344, etc. A TCP session 650 is established between the server 210 and the receiver_B 218.

As shown in FIG. 6, assuming no other entities on the network, the entire bandwidth of the common connection paths used for the communication between the server 210 and receiver_A 216 and between the server 210 and receiver_B 218 is shared between the four TCP sessions 620-650. As long as the network link between the server 210 and each receiver 216, 218 has sufficient capacity, then each TCP stream will operate at as high a bitrate as possible. However, when there is congestion in the network, in a conventional manner TCP will force all of the sessions to a common bandwidth. However, by creating more TCP sessions for segments of video which require it, the more complex video segments will still get more bitrate. For example, in the above example shown in FIG. 6, video sequence_A 202 will have ¾ of the available capacity of the congested network link, while video sequence_B 204 will have ¼. The ratio will vary on the relative numbers of TCP sessions dedicated to each segment of video being transferred.

Advantages

The present embodiment provides an equitable quality streaming for video sequences between a server and a number of receivers. The bandwidth allocated for delivering a video sequence is dependent on the quality and complexity of the video being delivered.

As mentioned above, in known adaptive streaming solutions, the bitrate of a TCP session is determined by the network and the transport protocol rather than the requirements of the content. In TCP, the bit rate is determined by the packet loss and round trip time. Therefore a number of TCP sessions competing for bandwidth over the same contended section of network will be forced to approximately the same lower bit rate. By allocating more TCP sessions to a more complex segment of video, then the allocation of bandwidth can be maintained even over a congested network link. In the above example, segment A1_1 302 and segment B2_1 332 have different quality levels and therefore issuing three GET requests for sequence_A and only a single GET request for sequence_B results in data for sequence_A receiving three-quarters of the available bandwidth even with the default TCP throttling behaviour.

Furthermore, buffer delays can are reduced by splitting the segments of video into streamlets as described. With parallel GET requests and therefore parallel TCP sessions, the data relating to the start of each video segment is delivered into the decoder buffer much more quickly.

Alternatives and Modifications

In the embodiment, the data is striped across a number of streamlets on a block by block basis. The skilled person will appreciate that the example is not limiting and other data sizes could be used, for example, bytes or sectors.

In the embodiment, the receivers and servers are configured to open and close TCP sessions corresponding to the number of streamlets for a given segment of video. In an alternative, a number of TCP sessions are established at the start of the streaming session and these TCP connections are kept open for data transfer. Furthermore, the receiver is able to select which TCP session from which to issue a GET in order to minimise transmission delays.

In the embodiment, the video sequence was delivered from a single location. In an alternative, web caching results in the video sequence being available from a number of different locations. Since the the TCP sessions sharing the same section of network may not have the same bitrate the streamlet data may be received at different times. Therefore more buffering is required at the receiver to be able to reassemble the data despite differences in deliver time.

In the embodiment, the video sequences are divided in to time segments before substreams are created. In a modification, segmenting into time chunks is not performed and therefore streamlets are created straight after the encoding of the video sequence. This may be useful for short clips, with videos where there is little variation in scene complexity or in networks where there is little variation in bitrate and therefore there is less need to periodically reassess the bandwidth and switch streams.

In the embodiment generation of substreams is performed by the encoder. In an alternative, the encoder only creates the encoded video which is stored on the data store and the segmenting is performed as a separate post process before being available to the HTTP server for streaming.

In the embodiment, the number of substreams created for a segment is based on the complexity parameter. In an alternative, the number of substreams generated is based on a decimation value. This value is not directly linked to the complexity and is set by a user. For example, the video author could specify that they want their video to always have two substreams. Similarly, the metadata file does not contain the complexity factor but simply the decimation value for each segment.

In the embodiment the operation of the streaming server related to video data, however other media content could be processed and streamed in the same way. For example audio presentations or multimedia clips.

In the embodiment, data is divided between each streamlet equally and the size of each data element in the stream is equal in size. In an alternative, different streamlets are formed of unequal sized data elements.

The invention claimed is:

1. A method of generating a multimedia presentation optimized for transmission from a source to a destination, the method comprising:
   dividing an input multimedia content into a plurality of segments of encoded media data, each segment including a plurality of frames of encoded media data;
   for each segment:
      determining a complexity value for that segment by analyzing an encoded bit rate of the media data in that segment, the complexity value being a measure of complexity of the plurality of frames associated with that segment;
      dividing the encoded media data in the segment into a plurality of sub-segments wherein,
         a number of sub-segments generated is dependent on the determined complexity value for the encoded media data for that segment, and
         the encoded media data within the segment being distributed across the sub-segments such that each sub-segment contains non-contiguous encoded media data; and
      storing the sub-segments corresponding to each segment of media data in a data store.

2. The method according to claim 1, further comprising generating metadata describing properties of the multimedia presentation and the number of sub-segments generated for each segment.

3. The method according to claim 1, further comprising encoding the input multimedia, wherein the complexity value for each segment is associated with an encoding quantisation parameter applied during encoding of a section of input multimedia corresponding to the segment, to maintain a predetermined level of quality.

4. The method according to claim 1 further comprising generating a plurality of versions of the sub-segments, each version relating to a different quality of multimedia.

5. The method according to claim 1 wherein the multimedia content s video data.

6. The method according to claim 1 wherein the complexity is dependent on the bit rate required to encode at constant quality.

7. The method according to claim 1 wherein the complexity is dependent on the bit rate required to encode at constant quality, with an increase in the bit rate corresponding to an increase in complexity.

8. An apparatus for generating a multimedia presentation optimized for transmission from a source to a destination, the apparatus comprising
   a data store configured to store an input multimedia content;
   a multimedia system, including an encoder and computer server, the system being configured for dividing an input multimedia content into a plurality of segments of encoded media data, each segment including a plurality of frames of encoded media data, and configured for each segment to:
      determine a complexity value for that segment by analyzing an encoded bit rate of the media data in that segment, the complexity value being a measure of complexity of the plurality of frames associated with that segment;
      divide the encoded media data in the segment into a plurality of sub-segments wherein,
         a number of sub-segments generated is dependent on the determined complexity value for the encoded media data for that segment, and
         the encoded media data within the segment being distributed across the sub-segments such that each sub-segment contains non-contiguous encoded media data; and
      store the sub-segments corresponding to each segment of media data in the data store.

9. The apparatus according to claim 8, wherein the multimedia system is further configured to generate metadata describing properties of the multimedia presentation and the number of sub-segments generated for each segment.

10. The apparatus according to claim 8, wherein the multimedia system is further configured to encode the input multimedia and wherein the complexity value for each segment is associated with an encoding quantisation parameter applied during encoding of a section of input multimedia corresponding to the segment, to maintain a predetermined level of quality.

11. The apparatus according to claim 8, wherein the multimedia system is further configured to generate a plurality of versions of the sub-segments, each version relating to a different quality of multimedia.

12. The apparatus according to claim 8 wherein the multimedia system is configured to process video data.

13. The apparatus according to claim 8 wherein the complexity is dependent on the bit rate required to encode at constant quality.

14. The apparatus according to claim 8 wherein the complexity is dependent on the bit rate required to encode at constant quality, with an increase in the bit rate corresponding to an increase in complexity.

* * * * *